United States Patent
Arnison

(10) Patent No.: US 7,869,577 B2
(45) Date of Patent: Jan. 11, 2011

(54) REMOTE ACCESS SYSTEM AND METHOD AND INTELLIGENT AGENT THEREFOR

(75) Inventor: Simon G. Arnison, Pickering (CA)

(73) Assignee: Voice On The Go Inc., Toronto (CA)

( * ) Notice: Subject to any disclaimer, the term of this patent is extended or adjusted under 35 U.S.C. 154(b) by 549 days.

(21) Appl. No.: 11/560,161

(22) Filed: Nov. 15, 2006

(65) Prior Publication Data

US 2007/0130337 A1  Jun. 7, 2007

Related U.S. Application Data

(63) Continuation of application No. PCT/CA2005/000776, filed on May 20, 2005.

(60) Provisional application No. 60/573,022, filed on May 21, 2004.

(51) Int. Cl.
*H04M 1/64* (2006.01)
*G10L 13/00* (2006.01)

(52) U.S. Cl. .................. 379/88.12; 379/88.01; 704/258

(58) Field of Classification Search ........................ None
See application file for complete search history.

(56) References Cited

U.S. PATENT DOCUMENTS

| | | | |
|---|---|---|---|
| 5,297,183 A | | 3/1994 | Bareis et al. |
| 5,825,854 A | | 10/1998 | Larson et al. |
| 5,907,680 A | * | 5/1999 | Nielsen ...................... 709/228 |
| 5,944,786 A | * | 8/1999 | Quinn ......................... 709/206 |
| 6,163,794 A | | 12/2000 | Lange et al. |

(Continued)

FOREIGN PATENT DOCUMENTS

EP  1116217  8/2003

(Continued)

OTHER PUBLICATIONS

Syroid et al., "Outlook 2000 in a Nutshell", 2000, pp. 244-261, Sebastopol, CA, O'Reilly & Associates.

(Continued)

*Primary Examiner*—David R Hudspeth
*Assistant Examiner*—Samuel Neway
(74) *Attorney, Agent, or Firm*—Bereskin and Parr LLP/S.E.N.C.R.L., s.r.l.

(57) ABSTRACT

The invention relates to remote access systems and methods using automatic speech recognition to access a computer system. The invention also relates to an intelligent agent resident on the computer system for facilitating remote access to, and receipt of, information on the computer system through speech recognition or text-to-speech read-back. The remote access systems and methods can be used by a user of the computer system while traveling. The user can dial into a server system which is configured to interact with the user by automatic speech recognition and text-to-speech conversion. The server system establishes a connection to an intelligent agent running on the user's remotely located computer system by packet communication over a public network. The intelligent agent sources information on the user's computer system or a network accessible to the computer system, processes the information and transmits it to the server system over the public network. The server system converts the information into speech signals and transmits the speech signals to a telephone operated by the user.

22 Claims, 5 Drawing Sheets

U.S. PATENT DOCUMENTS

| | | |
|---|---|---|
| 6,246,988 B1 | 6/2001 | Schier |
| 6,334,103 B1 | 12/2001 | Surace et al. |
| 6,366,650 B1 * | 4/2002 | Rhie et al. ............... 379/88.13 |
| 6,404,859 B1 | 6/2002 | Hasan |
| 6,408,272 B1 | 6/2002 | White et al. |
| 7,103,353 B2 * | 9/2006 | Suzuki .................... 455/414.2 |
| 2002/0103998 A1 * | 8/2002 | DeBruine ................... 713/153 |
| 2002/0191754 A1 * | 12/2002 | Liu et al. ................. 379/88.01 |
| 2003/0125955 A1 | 7/2003 | Arnold et al. |
| 2004/0093211 A1 * | 5/2004 | Reynolds et al. ............ 704/235 |

FOREIGN PATENT DOCUMENTS

| | | |
|---|---|---|
| JP | 10-303969 | 11/1998 |
| JP | 2003-060790 | 2/2003 |
| JP | 2004-078280 | 3/2004 |
| WO | WO 00/19408 | 4/2000 |
| WO | WO 00/67091 | 11/2000 |

OTHER PUBLICATIONS

CablesEdge SohoPA™ Desktop Client, accessed at www.cablesedge.com, May 2004.

CablesEdge SohoPA™, accessed at www.cablesedge.com, May 2004.

Japanese Office Action dated Jun. 7, 2010. Patent Appl. No. 2007-516917.

Copy of Japanese Office Action dated Jun. 7, 2010. Patent application No. 2007-516917.

Copy of English translation of Chinese Office Action dated Jun. 12, 2010 and received on Aug. 20, 2010, Chinese Patent Application No. 200810084758.2.

* cited by examiner

REMOTE ACCESS SYSTEM AND METHOD AND INTELLIGENT AGENT THEREFOR

CROSS-REFERENCE TO RELATED APPLICATIONS

This application is a continuation of International Application No. PCT/CA2005/000776 filed on May 20, 2005, which claims the benefit of U.S. Provisional Application Ser. No. 60/573,022 filed on May 21, 2004, the entire contents of both of which are hereby incorporated by reference.

FIELD OF THE INVENTION

The present invention relates to remote access systems and methods using automatic speech recognition to access a computer system. The invention also relates to an intelligent agent on a computer system for facilitating remote access to, and receipt of, information on the computer system through speech recognition or text to speech read-back.

BACKGROUND OF THE INVENTION

Desktop computers and larger computer systems are increasingly being used to store private, secure and personal information for both consumers and business users alike. This information is not easily accessible from any remote location where the consumer or business user may find themselves. Mobile phone data technologies have been developed by companies such as Visto and GoToMyPC to allow a remote customer to retrieve some information stored at their business on a server, or on a personal computer, but these programs require very good data coverage networks, high priced smart mobile devices, expensive data plans and considerable sophistication on the part of the user. Added to this is that they are not practical or safe for use in a vehicle, while driving.

It is desired to address or ameliorate one or more disadvantages or shortcomings of existing methods for remote access of a computer system, or to at least provide a useful alternative thereto.

SUMMARY OF THE INVENTION

One aspect of the invention relates to a method of providing remote access to a computer system over a public network, the method comprising the steps of:

receiving at a server system a voice call from a user of the computer system;

processing information received from the user during the voice call to generate identification information;

authenticating the user based on the identification information;

establishing a connection between the server system and the computer system based at least in part on the identification information;

receiving at the server system speech commands from the user;

generating first packet data based on said speech commands;

transmitting the first packet data over the public network to an agent on the computer system;

receiving second packet data at the server system from the agent in response to the first packet data; and generating a speech signal to the user the voice call based on the second packet data.

Preferably, the agent is configured to interpret the first packet data, interrogate application software installed on the personal computer and generate second packet data based on the interrogation.

In one embodiment, the method further comprises receiving at the server system an IP address of the computer system from the agent resident on the computer system and the establishing is based also on the IP address. This embodiment is applicable where the computer system is protected by a firewall.

Another aspect of the invention relates to a system for providing remote access to a personal computer over a network, the system comprising a server system connected to the network and to a telephone network, the server system being configured to:

receive a voice call over the telephone network from a user of the personal computer and to receive information and speech commands from the user during the voice call;

determine an IP address of the personal computer based at least in part on the information received from the user;

generate first packet data based on the speech commands;

transmit the first packet data over the network to an agent running on the personal computer;

receive second packet data from the agent via the personal computer; and generate speech signals to the user based on the second packet data.

In a related aspect, the invention also relates to computer readable program storage having stored thereon computer program instructions which, when executed on a computer system, cause the computer system to perform the method of providing remote access described above.

Another aspect of the invention relates to a method of providing automatic notification to a user, comprising the steps of:

providing on a computer associated with the user, at least one rule for determining the occurrence of a notification event;

applying the at least one rule to determine the occurrence of the notification event;

generating notification data representative of the notification event;

transmitting the notification data over a network to a server system for communication of a notification, based on the notification event, to a telephone of the user;

generating speech signals corresponding to the notification;

establishing a telephone connection to the telephone of the user; and transmitting the speech signals to the telephone of the user.

In a related aspect, the invention also relates to a system for providing automatic notification to a user, wherein the system comprises an intelligent agent running on a computer associated with the user and the system comprises program code for causing the system to perform the steps of the method of providing automatic notification described above.

In a further related aspect, the invention also relates to computer readable media having stored thereon computer program instructions executable by one or more computer processors to cause the one or more computer processors to perform the steps of the method of providing automatic notification described above.

A further aspect of the invention relates to a method of providing notification to a user, comprising:

receiving a connection request over a network from an agent on a computer associated with the user;

receiving notification data over the network from the agent;

processing the notification data to generate a speech notification;

establishing a telephone connection to a telephone of the user based on the connection request; and transmitting the speech notification to the telephone of the user over the telephone connection.

Preferably, the step of establishing comprises determining a user identifier from the connection instruction, accessing a database to determine a telephone number of the user based on the user identifier and calling the telephone number.

In a related aspect, the invention also relates to a system for providing notification to a user, wherein the system comprises a server system in communication with the user and an agent and the server system is programmed to perform the steps of the method of providing notification described above.

In a further related aspect, the invention also relates to computer readable media having stored thereon computer program instructions executable on a computer system to cause the computer system to perform the steps of the method of providing notification described above.

A further aspect of the invention relates to a system for remote access of a computer system over a public network, the system comprising:

a server system, the server system being in communication with a public telephone network for receiving voice calls from a telephone operated by a user and for transmitting automatically generated speech signals to the telephone; and an agent resident on the computer system, the agent being in communication with the server system and programmed to index information accessible to the computer system based on predetermined user rules and to the transmit the information to the server system in response to a predetermined event;

wherein, when the server system receives the information from the agent, the server system is programmed to automatically generate speech signals corresponding to the information and to transmit the speech signals to a registered telephone associated with the user.

In one embodiment, the computer system is separated from the server system by a firewall and wherein the agent is programmed to periodically transmit an IP address of the computer system to the server system.

In one embodiment, the computer system is a personal computer. Alternatively, the computer system is a server system and the user has a user account on the server system.

In one embodiment, the predetermined event is a notification event originating from the agent, the notification event being generated by the agent based on at least one user-defined rule.

Preferably, the server system comprises a speech server for communication with the user over a public telephone network using automated speech recognition for the received speech signals and automatic text-to-speech conversion for transmitted speech signals.

Preferably, the server system further comprises a voice relay server in communication with the speech server and in communication with the agent for receiving the information from the agent and for transmitting command request data to the agent corresponding to a voice command received from the user at the speech server.

Preferably, the server system comprises a user information data store and the voice relay server compares user authentication information corresponding to an identification utterance received from the user at the speech server to the user information data store to authenticate the user for access to the computer system.

BRIEF DESCRIPTION OF THE DRAWINGS

Embodiments of the invention are described in further detail below, by way of example only, with reference to the accompanying drawings, in which.

DETAILED DESCRIPTION OF THE PREFERRED EMBODIMENTS

Figure 1:
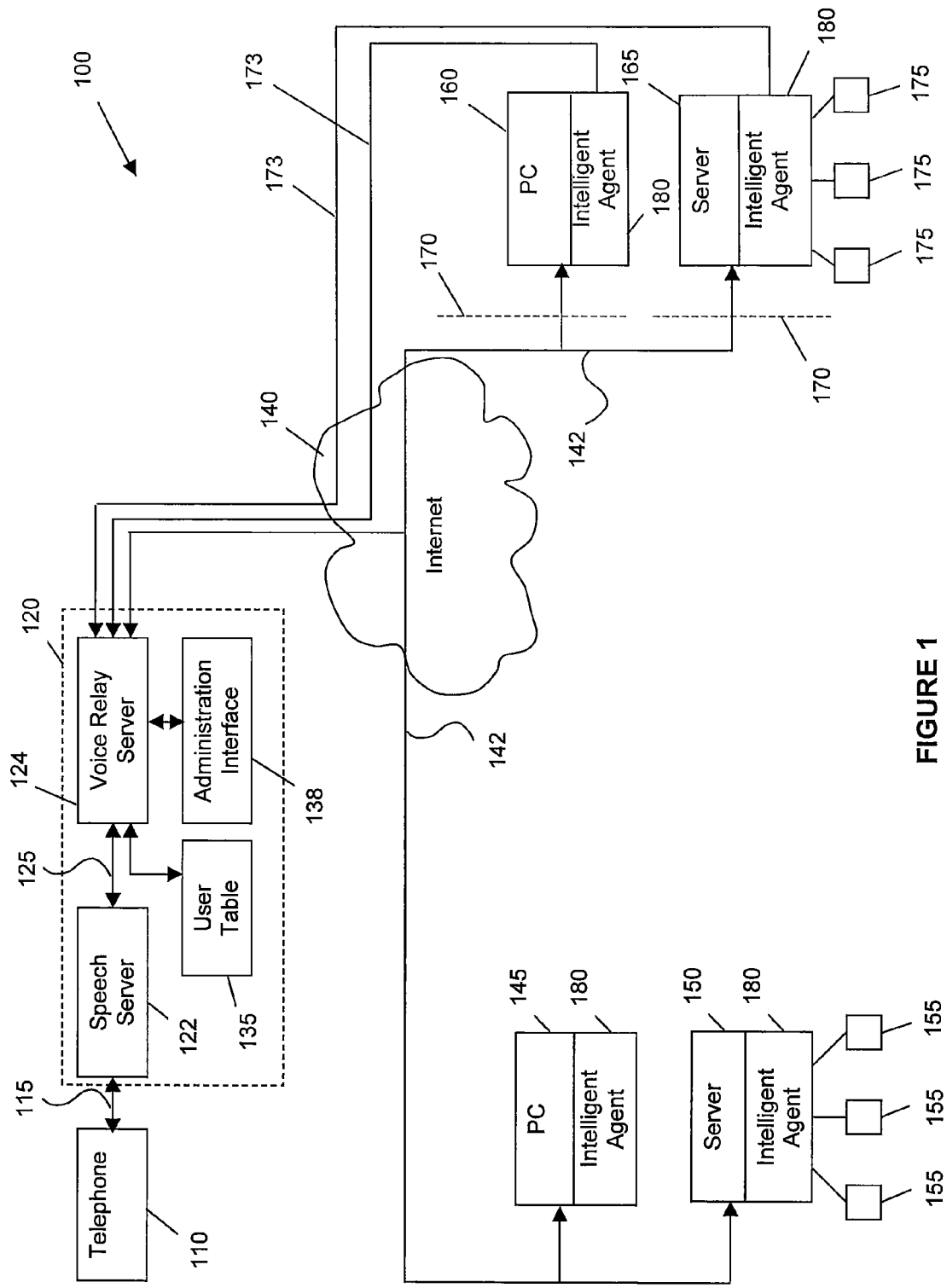
FIG. 1 is a block diagram of a remote access system according to one embodiment.

In one aspect, the invention relates to arrangements made for using the human voice to interact with a server system (including a speech server and a voice relay server), which in turn interacts with an intelligent agent running on a remote computer system to retrieve and review information, such as personal information, accessible to the computer system. Generally, the invention relates to methods which involve converting speech input commands to computer commands which are transferred to the specific computer system (ie. PC or server) associated with the caller or the server where the caller's account or user-specific information resides, in a secure manner. This method may be used where the computer system does not necessarily have a public address (IP Address) or where the server does not necessarily have a public IP address, and where the PC or server is behind a firewall connected to an Internet connection at all times.

Another aspect of the invention relates to an intelligent agent residing in the computer system of a user and programmed to react to rules-based events within or accessible to the computer system (such as a new data item appearing in a database, or a news item appearing on a news service with a particular matched keyword, or a new email message containing a certain key word or phrase) and then to push a synthesized speech message via the server system out to a (mobile or terrestrial) telephone to alert the user to the event in a voice speech format.

Using voice commands to access information stored on a personal desktop computer, and to have personal information on the desktop computer converted back into voice and sent via voice lines to a telephone, requires secure two way communications between three components of the system. A spoken command or identity phrase identifies the caller to a server which acts as a relay between the original voice call and the callers home or business-based desktop computer or server system. The caller must identify herself via a user identity, pin number or through biometric speech pattern recognition so that the voice relay server may directly connect the caller to her PC or server containing her personal information. The connection is then held open in order that the caller can issue speech commands to hear information from the caller's personal PC or server account.

The intelligent agent on the PC or server is able to extract information from sources, such as the Internet or local application software programs, in order to securely deliver the information to the voice server to be converted into a speech pattern for the caller to hear the information. The user may issue speech commands to stop and start services and programs on the user's desktop computer or server, or to append, delete, forward or reply to information, which the intelligent agent may source or otherwise be able to access. The user may also issue speech commands to compose or create new data objects on the PC or server, such as a calendar entry, email or database entry.

Referring now to FIG. 1, there is shown a block diagram of a remote access system 100. The remote access system 100 comprises a server system 120 linked to a caller using a mobile or land-line telephone 110 over a connection 115 through a public telephone network, server system 120 processes speech signals received from the user and responds with synthesized speech signals in order to facilitate verbal interaction between speech server 120 and the user of telephone 110.

Remote access system 100 further comprises one or more computer systems (shown as 280 in FIGS. 2 and 3) located remotely from server 120, but in communication with the server 120 over a public network 140, such as the Internet. Such remote computer systems 280 may comprise a personal computer (PC) 145 or a server 150 having fixed IP addresses known to server 120. Alternatively, or in addition, computer systems 280 may comprise a PC 160 or server 165 behind respective firewalls 170. Server 150 and server 165 may have a plurality of user accounts 155 or 175, respectively, associated therewith so that the user accounts are hosted by the server. Computer systems 280 may be any kind of computer system, including intelligent mobile devices and large server systems, that has the ability to communicate over public network 140.

For a PC 160 or server 165 protected by firewalls 170, the firewalls obscure the IP addresses from server 120. Accordingly, in order for server 120 to communicate with PC 160 or server 165, PC 160 and server 165 must communicate their respective IP addresses to server 120. Such notification is performed by an intelligent agent 180 resident on the PC 160 or server 165 and programmed to periodically notify server 120 of any change in the IP address of PC 160 or server 165. Alternatively, the intelligent agent may perform such a notification function even when the PC 160 or server 165 is not protected by a firewall 170. For example, if PC 160 is connected to internet 140 by a dial-up modem connection through an internet service provider, the PC 160 may not have a static IP address. Accordingly, in order for the server 120 to establish a connection to PC 160, PC 160 must notify server 120 of its current IP address. The intelligent agent resident on the PC 160 or server 165 notifies server 120 of the IP address of the PC 160 or server 165 by transmitting notification packet data 173 to server 120 via network 140. The intelligent agent 180 is described in further detail below, with reference to FIGS. 2 and 3.

Server system 120 comprises a speech server 122, a voice relay server 124, a user table 135 and an administration interface 138. Speech Server 122 is responsible for automatic speech recognition (ASR) of utterances received from the user of telephone 110 over a public telephone at link 115 and for automatic text-to-speech (TTS) conversion for converting information received from the user's PC 145, 160 or server account 155, 175 into audio speech signals for communication to the user of telephone 110. Speech server 122 is preferably an IBM Voice platform including an IBM websphere voice response server-telephone and application integration coupled with an IBM websphere voice server for voice response—TTS/ASR. Alternatively, speech server 122 may be a VoiceGenie speech server running ASR and TTS resource management.

If speech signals received at speech server 122 from the user of telephone 110 are recognized by the (ASR) module of speech server 122, the corresponding text strings generated by the ASR module are transmitted to voice relay server 124 through a two-way data link 125. Voice relay server 124 processes the converted speech thus received from speech server 122 and initiates appropriate actions based on the processed speech. For example, during initiation of the remote access process, the user is required to provide a user identifier (ID) and a password. When these are received by voice relay server 124 from speech server 122, Voice Relay Server 124 compares the user identifier and password with entries in a user table 135 (or other form of database) to authenticate the user as a valid user of the remote access system 100. Once the user has been authenticated by server 120, voice relay server 124 treats further converted speech from speech server 122 as commands concerning the user's interaction with the remote computer system. Voice relay server 124 also use's user table 135 to store the current or last known IP address of the computer system associated with each user. Once a user is authenticated by server 120, data transmissions by voice relay server 124 to the users computer system will be directed to the IP address associated with that user in user table 135.

Administration interface 138 is used for entering the fixed IP Addresses of PC 145 and server 150, as well as inserting and updating the user phone numbers, ID and passwords in used in user table 135.

FIG. 1 shows remote access system 100 having a data link 142 connecting server 120 with PCs 145, 160 and servers 150, 165 via network 140. It should be understood that data link 142 may be any kind of connection (virtual or physical) according to the appropriate network protocols employed by public network 140. Data link 142 is unlikely to be a physical connection. Further, data link 142 is unlikely to be the same for each PC or server in communication with server 120. Rather, each PC 145, 160 or server 150, 165 communicates independently with a server system 120. Data link 142 is preferably a secure socket layer (SSL) connection.

Figure 2:
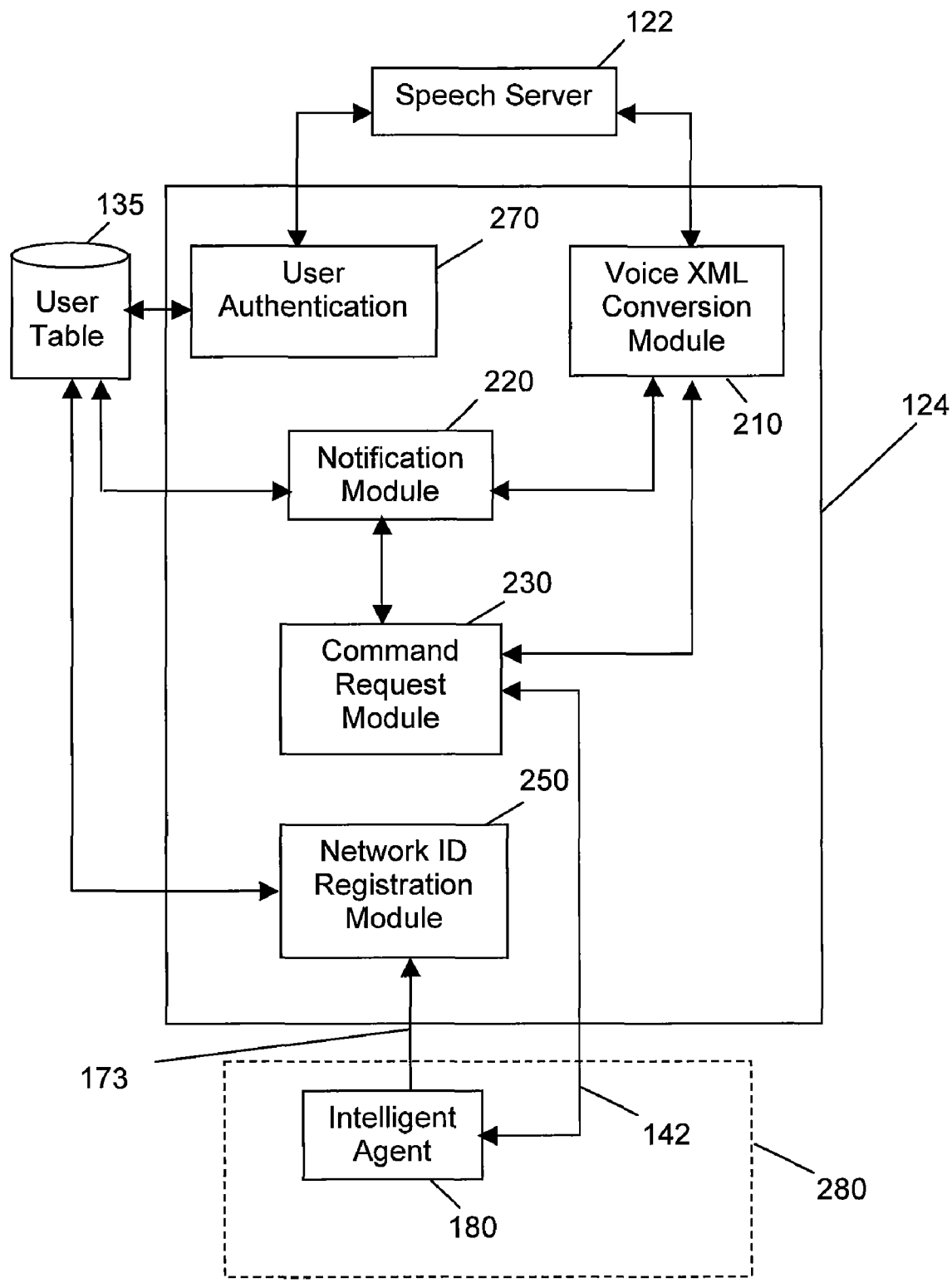
FIG. 2 is a block diagram of a voice relay server according to another embodiment.

Referring now to FIG. 2, the voice relay server 124 is shown and described in further detail. Voice relay server 124 comprises several functional modules for interacting with speech server 122, intelligent agent 180 and user table 135. Voice relay server 124 comprises a voiceXML conversion module 210 for accepting incoming voice commands from speech server 122 and translating these commands into an internal data structure (which is described in further detail below) for communication to a command request module 230 of the voice relay server 124. The command request module 230 interprets the internal data structure and generates packet data based on the speech commands processed through the VoiceXML conversion 210. Command request module 230 communicates with intelligent agent 180 via data link 142 over a public network, such as the Internet, by transmitting the packet data corresponding to the converted speech command to the user.

Figure 5:
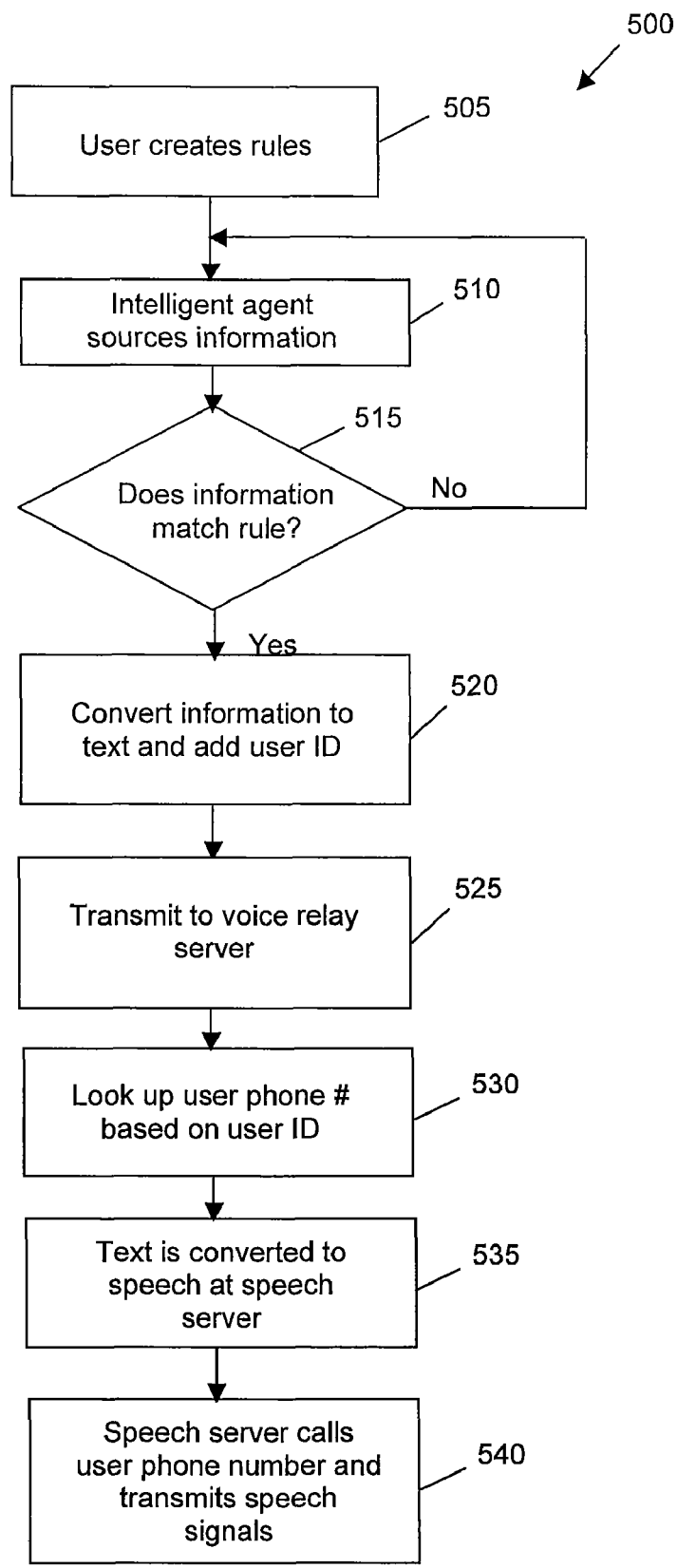
FIG. 5 is a process flow diagram of a method for automatically notifying a user by telephone of an information event monitored by the intelligent agent.

Voice relay server 124 further comprises a notification module 220 for converting packet data received from intelligent agent 180 (as described further in relation to FIG. 5) into the internal data structure recognized by voiceXML conversion module 210 for transmission to the user of telephone 110 using the text-to-speech conversion feature of speech server 122. The notification module 220 may receive the incoming packet data from intelligent agent 180 directly or through command request module 230.

Voice relay server 124 further comprises a network ID registration module 250 for receiving the periodically transmitted IP addresses of the computer system 280 on which intelligent 180 is resident. This is only done by intelligent agents 180 resident on computer systems having dynamic IP addresses or which are otherwise unable to provide a fixed IP address. network ID registration module 250 receives the IP address notification packet 173 and stores the IP address in user table 135 with the relevant user entry. For this purpose, the IP address notification packet (or packets) indicates the user ID (and optionally also the password) for which the updated IP address is being provided. Intelligent agent 180 knows the IP address of voice relay server 124 from when the intelligent agent 180 is first installed on the user's computer system 280.

Voice relay server 124 also has a user authentication module 270 for authenticating the user prior to setting up communications between the voice relay server 124 and the intelligent agent 180 on the user's computer system 280. User authentication module 270 communicates with speech server 122 to receive a converted text string corresponding to the user's spoken identification and password utterances. User authentication 270 then interrogates user table 135 and compares the user ID and password strings received from speech server 122 with the entries in user table 135. If there is a match of the received string with a user entry, the user is authenticated to establish a link to the user's computer system 280 and the last known IP address stored for that user in the user table 135 is provided to voice relay server 124 for initiating communication with the intelligent agent 180 resident on the user's computer system 280.

If the user authentication module 270 is not able to match the received user ID and password strings to an entry in user table 135, user authentication module 270 communicates this match failure to speech server 122, which provides a corresponding synthesized speech message to the telephone 110 of the user. Such a message is also transmitted to the user from speech server 122 if voice relay server 124 is unable to obtain a response to the initiation packets transmitted from the voice relay server 124 to intelligent agent 180 or if the user ID and password are not recognized by the intelligent agent 180 or the user's computer system 280.

Figure 3:
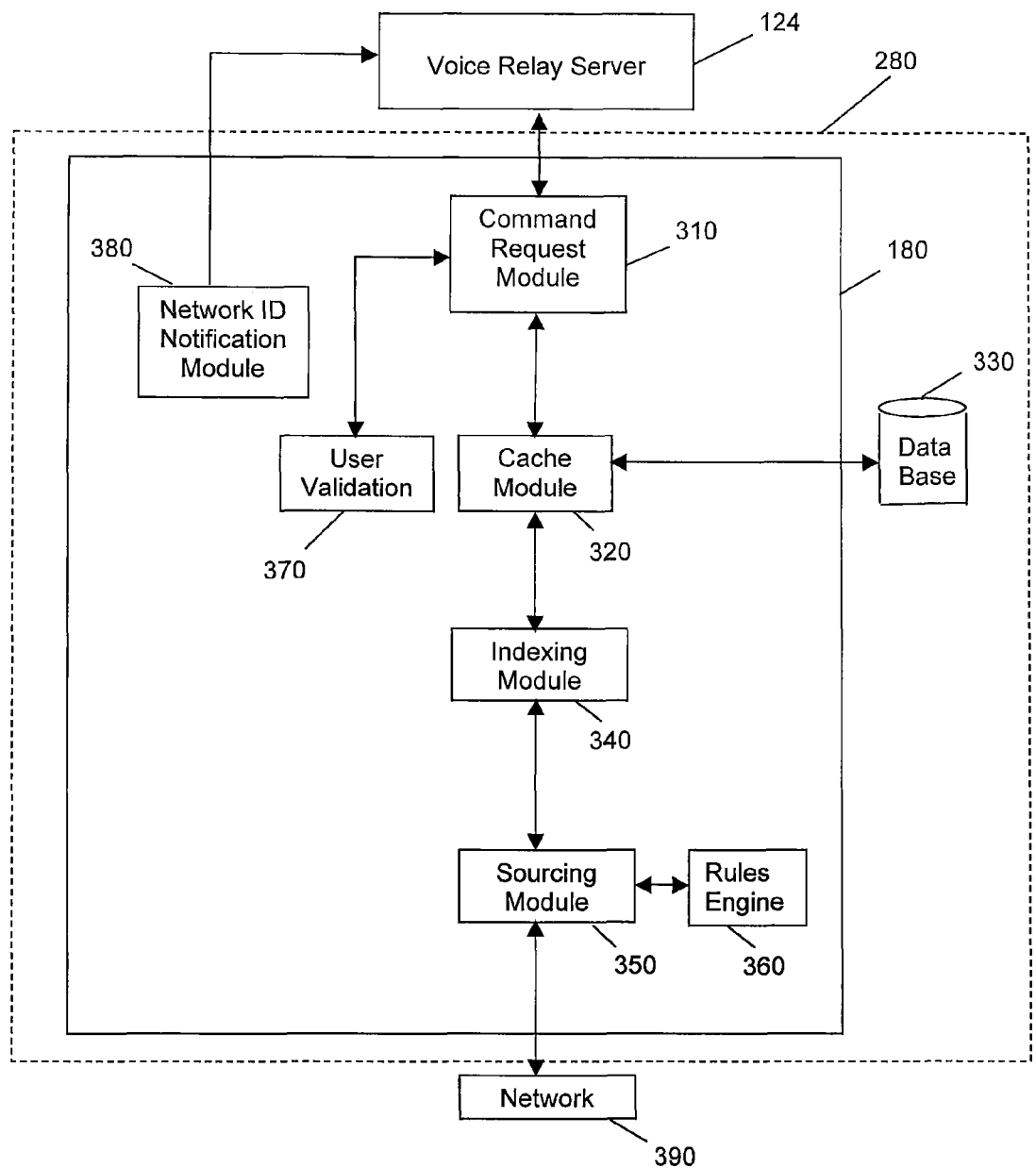
FIG. 3 is a block diagram of an intelligent agent according to another embodiment.

Referring now to FIG. 3, the intelligent agent 180 is shown and described in further detail. Intelligent agent 180 comprises a command request module 310 for handling the transmission of command (or initialization) related data packets between voice relay server 124 and intelligent agent 180. If command request module 310 receives an initialization packet from Voice Relay Server 124 to establish a connection with the computer system 280 which is a server on which intelligent agent 180 is resident, the command request module 310 will check the user ID and password information embedded in the initialization packet by forwarding the packet to a user validation module 370 in intelligent agent 180. If user validation module 370 matches the user ID and password in the initialization packet with a stored user ID and password for a valid user account on the server 280, the user is validated for the computer system. Otherwise, user validation module 370 indicates to command request module 310 that the received user ID and password do not correspond to a valid account on the server 280 and a corresponding message is sent back to voice relay server 124 for communication to the user via speech server 122.

Intelligent agent 180 further comprises a cache module 320 in communication with the command request module 310 and in communication with an indexing module 340. Cache module 320 keeps a local store of personal or other information that can be retrieved quickly without having to source the information from an external source, such as a data source available through network 390.

Intelligent agent 180 further comprises indexing module 340, a sourcing module 350, and a rules engine 360. The rules engine 360 is programmed to source information on a scheduled basis according to a number of user-defined rules. These rules may specify the kinds of information which are to be sourced, such as emails, calendar items, news items, database entries or other dynamic forms of information which are updated or newly created over time.

The rules engine 360 is used in concert with sourcing module 350 to source information primarily for the purpose of alerting a user (according to the rules defined by the user) of new or updated information of interest to the user so that a telephone call can be placed to the user and the salient details of the information read to the user by speech server 122. Alternatively, rules engine 360 may be used to configure the user interface that the user encounters when connecting into the user's computer system. For example, according to the rules, the intelligent agent 180 may present only unread emails for the user to retrieve and hear through speech server 122, rather than making the user's entire email inbox available.

The sourcing module is responsible for periodically sourcing the information (according to the rules in the rules engine 360) from data sources on network 390 or on computer system 280. Network 390 may be a local area network or a large network, such as the Internet. Sourcing module 350 provides the source information to indexing module 340, which compresses and indexes the information and provides it to cache module 320, which stores the compressed and indexed information in a data source or database 330 accessible to the computer system 280. Sourcing module 350 may source information from within computer system 280 as well as, or instead of, sourcing information from data sources in network 390.

Intelligent agent 180 further comprises a network ID notification module 380 which transmits notification packets on a regular (scheduled) basis to network ID registration module 250 of voice relay server 124 if intelligent agent 180 is resident on a computer system 280 that does not have a fixed IP Address.

Figure 4:
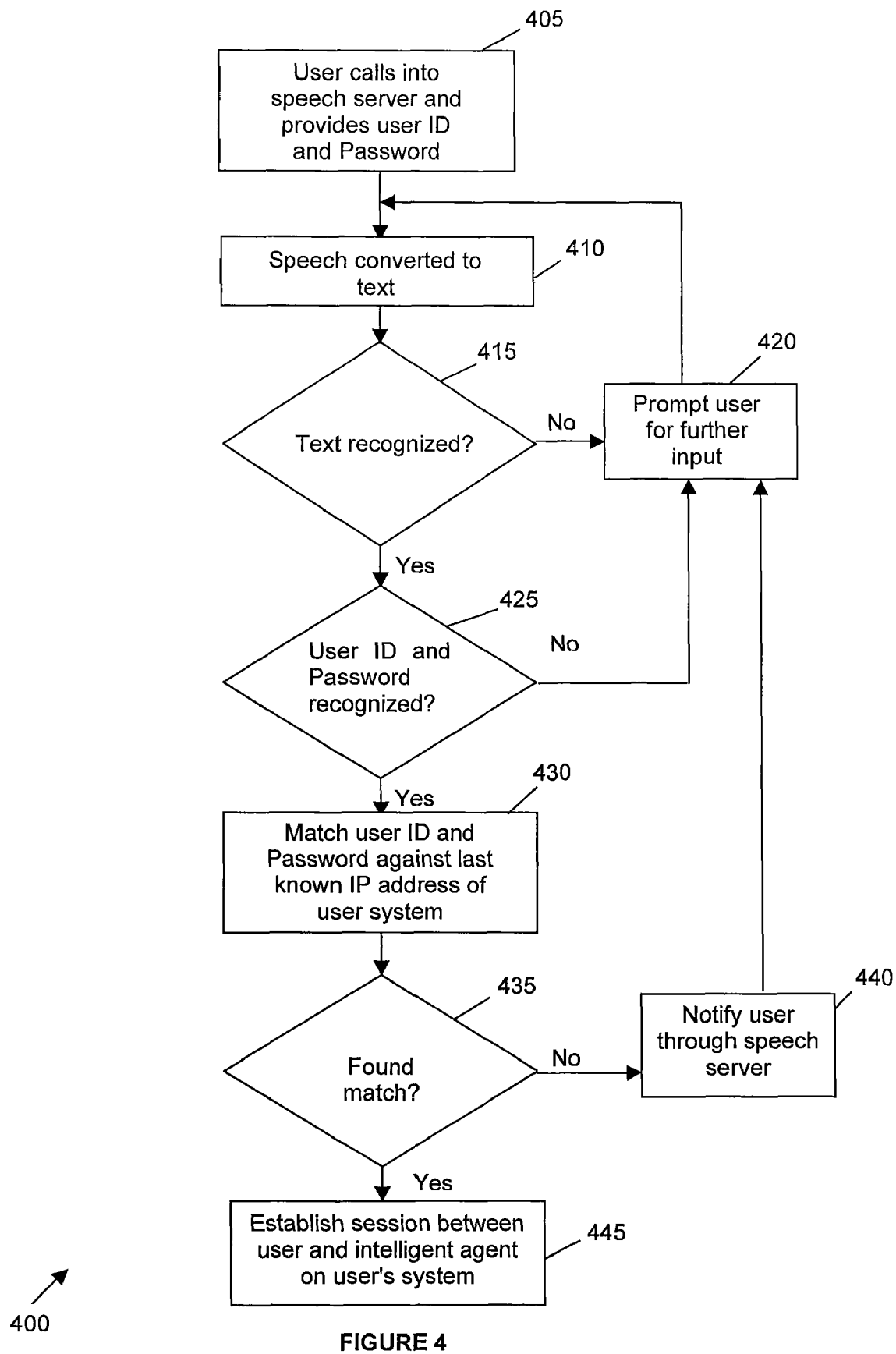
FIG. 4 is a process flow diagram of a method of establishing remote access to a user computer system from a user phone.

Referring now to FIG. 4, a method 400 for establishing remote access to computer system 280 from a user phone 110 is shown and described. Method 400 begins at step 405, when a user calls into the speech server 122. The speech server 122 can receive calls from either mobile or terrestrial telephone networks. The user is prompted by an interactive voice response system executing on speech server 122 to provide the user's ID and password. This may be through spoken utterances or by input in the direct keypad of the user's phone (or other telecommunication device) 110 or a combination of these. The automatic speech recognition function of speech server 122 converts the user's utterances to one or more text strings at step 410. If the utterances are not recognizable at step 415, speech server 122 requests the user, at step 420, to try again to provide the user ID and password.

If the text is recognized at step 415, the user ID and password strings are transmitted to the voice relay server 124 from speech server 122. At step 425, the voice relay server 124 checks the user ID and password against entries in user table 135 to authenticate the user. If the user ID and password are not recognized (i.e. not contained in user table 135), the user is prompted for further input at step 420 and steps 410 to 425 are repeated (up to a predetermined number of times.)

If the user ID and password are recognized at step 425, the last known IP Address corresponding to the matched user ID and password is determined, at step 430. If no corresponding IP Address is found at step 435 or if a match is found but that IP Address fails to respond to an initiation packet from Voice Relay Server 124, the user is notified that the system does not have access to a valid or current IP Address, at step 440. The user may then be prompted for further input at step 420 or the voice call may be terminated.

If, at step 435, an IP Address corresponding to the user ID is found in user table 135, a communication initiation packet is transmitted from voice relay server 124 to the intelligent agent 180 to computer system 280 and, unless the intelligent agent 180 fails to respond with an acknowledgement packet, a communication session is established between the server system 120 and the user's computer system 280, at step 445.

Once a communication session is established, intelligent agent 180 and voice relay server 124 exchange packet data so that information can be retrieved through command request module 310 of intelligent agent 180 and commands can be transmitted from command request module 230 of voice relay server 124 for retrieving information requested by the user. Such command transmission and information retrieval in response is performed by transmission of data packets between computer system 280 and server system 120 while the user of telephone 110 communicates with speech server 120 in real-time, issuing speech commands and listening to synthesized speech signals corresponding to the information retrieved computer system 280.

Method 400 is used to facilitate the primary purpose of remote access system 100, which is to enable a user to access information on the user's computer system 280 while the user is located remotely from the user's computer system 280, for example while traveling or working from home. Once method 400 is performed and the communication session is established between intelligent agent 180 and Voice Relay Server 124, the user may retrieve, create or modify information or objects as desired, including documents, emails, news items, calendar, objects, database entries or other information or objects susceptible of translation between speech and other data forms.

In another aspect, the remote access system 100 may be used to automatically notify a user of new or updated information available to computer system 280 (as sourced and indexed by intelligent agent 180) by automatically establishing a connection between intelligent agent 180 and server system 120 and automatically placing a telephone call to a phone registered to the user. Such a method of automatic notification is shown and described in FIG. 5 as method 500.

Method 500 begins with the creation by the user of rules for sourcing information content to be provided to the user on an automatic basis. The rules are created by the user at step 505, preferably using a rules creation wizard to assist the user in establishing the type of information to be sourced, and the frequency with which it is to be sourced and the conditions or timing by which by the user is to be notified. The rules may also specify key words or other criteria for sourcing the information.

At step 510, the intelligent agent 180 sources information from computer system 280 or network 390 as described previously. At step 515, intelligent agent 180 checks that the source information matches one or more of the user defined rules. If the information does not match a rule, it is discarded or at least not indexed by indexing module 340 and the intelligent agent continues to source further information at step 510. If the information does match one of the user defined rules at step 510, the information is processed through indexing module 340 and cache module 320 as content objects (described below) and stored in database 330 until the scheduled time for notifying the user. At the scheduled time, information satisfying the user-defined rules is loaded into command request module 310 from cache module 320 and converted to packetized text at step 520. Each of the packets having the notification information also includes the user ID.

At step 525, the notification information packets constructed at step 520 are transmitted to the command request module 230 of Voice Relay Server 124 and passed on to notification module 220. Using the user ID attached to the notification information packets received from computer system 280, notification module 220 accesses user table 135 to determine a telephone number corresponding to the user ID at step 530. Once all of the notification information packets are received at Voice Relay Server 124, the notification module 220 processes the packets to place them in a form readable by the VoiceXML conversion module 210 and the notification information is transmitted to speech server 122 as a Voice XML object. At step 535, speech server 122 converts the VoiceXML to synthesized speech signals for transmission to the user.

At step 540, speech server 122 dials the user's phone number and, if the user picks up the call, the speech signals are transmitted to the user. If the user does not pick up the call, server system 120 may prepare a non-speech notification to the user, such as a text message or other form of short message indicating that the user has a notification awaiting receipt on the server system 120 and providing a return access number for the user to call to retrieve the notification (according to method 400).

Advantageously, remote access system enables the user to easily access information on the user's computer system 280 from a remote location where the user would not otherwise be able to access his or her desired information. Further advantageously, the remote access system 100 can be configured by the user to be proactive in providing information to the user, automatically notifying the user of available information which the user has already indicated he or she would like to receive remotely.

In one embodiment, the voice relay server uses a probabilistic indexing technique for indexing utterances from the user. This indexing technique allows for improved performance and greater efficiency for accepting speech requests on a speech server and converting these to data requests to be sent to the voice relay server.

A probability that a certain request via voice will be made by a voice caller is used to assess what key words would be loaded at the point when a caller requests information. For example if the user request an email to be heard via the server system 120, then by a probability match the most likely responses will be commands commonly (or previously) associated with emails, such as "delete, remove, next, reply, respond, forward, previous, repeat". However the user may say with a lower likelihood commands such as "transmit, response, subsequent, erase, replay". Based upon the speech command that is said, the server system 120 builds a profile of speech commands, ranks them according to frequency of usage and associates them to a particular event in the speech interaction process.

Thus, the voice relay server probabilistic indexing technique provides dynamically created pattern matched maps of possible utterances as input to the speech. Whenever a user interacts with the remote access system 100, a mapping of user interactions is developed and maintained such that an indexed list of possible interactions is developed dynamically. When the user subsequently accesses the system, the speech server 122 will be fed an indexed list of possible inputs from the voice relay server 124 to ensure that the recognition process success rate rises above the previous failure rate norm.

In order to perform the probabilistic indexing, the voice relay server comprises an interaction analyzer and indexed list generator (both not shown).

Interaction Analyser—For each user interaction with the system the components accessed are analyzed and the interaction ranked as a probable future voice interaction. These interaction lists are kept available for future processing. A predictive model of utterances is generated and stored on disk or in memory and adapts in real-time to continued use. This list is sorted according to the patterns and profiling of the use of the service and is continually revised.

Indexed List Generator—Based on a particular voice interaction and the content of a voice page of information (VoiceXML page). This component accesses the lists created by the Interaction Analyser and dynamically generates a list of indexed possible utterances. The latter lists are made available to the voice relay server 124 based on the specific context, and are generated as a set of grammar which is loaded onto the speech server 122 as necessary.

The intelligent agent 180 may be programmed via rules engine 360 to respond to information which is new or changes to information on the desktop PC or in the server. New or changed information that is captured by a rule triggers an outbound alert to the voice relay server in the form of a packet message, which is converted by the voice relay server into speech packets or signals and then forwarded to a telephone (mobile or terrestrial). The user, upon receiving the call, listens to the automatically generated alert message.

The rules engine allows for discrete profiles to be created for each data source to allow for the user to be able to have notifications of only information that they specifically choose. Below are brief descriptions of components of rules engine 360.

Rule Builder—This component accepts a set of inputs to construct a rule. It predefines a set of conditions and constraints which should be met for the execution of a particular action.

Reasoning Module—This component analyzes a set of conditions and inputs and checks if rule and policy criteria are met. It locates rules, confirm permissions on rules and also checks that execution times and conditions are adhered to.

Rule Validator—This component is responsible for evaluating the validity of the rule. It checks for completeness, integrity and the presence of the necessary conditions and their measurement indicators before a rule is considered valid for processing by the rule processor.

Rule Processor—This component is responsible for using the Rule Validator to validate the rule. Next it uses the Reasoning Module to check if the rule has to be executed. Then it is responsible for the execution of the Rule Action.

Functional processing—A rule typically consists of a set of strings that are generated by a Rule Builder, which may be a programmatic interface or may be a user form for input of these strings. Each string entered is validated by the Rule validator that may for example inform the Rule Builder of inconsistent structure to a string (extra characters or non-conforming characters) or inconsistent data structure (for example a date in EU format 25/12/04 may not be processed or accepted unless it is in the US format 12/25/2004). This rule is then stored and associated with a particular user.

The Intelligent agent 180 application is designed to manage one or more rules for one or more users. A scheduler built into the intelligent agent is designed to interrogate incoming information and match the strings or user defined rules against the information which may be structured. Hence a news item with a date field may be compared against a user selected date item and when a match occurs a notification event is generated. The intelligent agent also supports the ability to be triggered by an in-coming data item and can perform the same matching process against these data items as well.

The voice relay server 124 may have several connections to remote PC's or servers. The main services that handle the communication between the two end points are the intelligent agents command request module in the PC or server and the command request module in the voice relay server. A command processor (not shown) within the command request module is responsible for constructing and de-constructing the packets of information that are sent to and from the remote services. The command processor module is designed to handle the variety of requests that may originate at either point in the network.

The Command Processor listens for in-coming requests over a TCP/IP connection. If the user is first logging on to the service then credentials are sent to the remote PC or server intelligent agent as a serialized string representation of the user name and password. This establishes the authenticity of the user and allows for a continued dialog with the remote intelligent agent, or will reject the request. Upon successful authentication, a TCP/IP session is established between the two systems and the Command Processor then deals with the information received at either end. Serialized strings are passed between the intelligent agent 180 and the voice relay server 124. A protocol for communication that provides a mechanism to allow for a wide variety of speech requests and payload replies to be handled by the system, is implemented the intelligent agent 180 and the voice relay server 124 and is used to invoke actions and services, an example of this protocol is shown:

<ServiceNameHeader><ServiceMethodName><ServiceMethodParameter1> . . . <ServiceMethodParameterN><EndOfServiceRequest>

In the example above a Servicenameheader is a standard name of a data service type that is required to be accessed or delivered, the methodname determines what action is to be performed on that item and the method parameters are the dynamic variables such as a list of items or specific data elements.

An example of the data components of a request would be:

<Email><Readback><Number1><Number2><Number3><end> or <Calendar><create><type=appointment, date=March 17, time=6.30pm, duration=1 hour>

This protocol also can be used to invoke actions or services on both the voice relay server and the intelligent agent at on the PC or server. The service method handler is different at each of the voice relay server and the intelligent agent, since the services are different for either. For example the intelligent agent will send a request to the voice relay server to prompt a user for some voice input—such as requesting the name of a person to retrieve from a local telephone book stored on the PC/server. The voice relay server 124 will in turn request that the intelligent agent open the phone book for interrogation. This protocol provides the framework for bi-directional communication between the voice relay server and the intelligent agent at the end points.

The intelligent agent manages a set of user-defined rules that pertain to electronic information filtering and retrieval from programs and information connected to the PC or server. For example, the user may create a rule that reads from a database file a specific field entry and, when there is a change to this entry that satisfies the rule, the intelligent agent will recognize the change and will send an alert (summarized or otherwise) to the voice relay server, which is targeted to the specific user's telephone number, to read the alert to the user as a speech stream.

Changes to content to which the rules apply are monitored and recognized by intelligent agent software that controls content sourcing on the PC. Indexing techniques for content are described below.

The intelligent agent also creates a local cached object reference in cache module 320 to data items that satisfy the rules, which is maintained and managed by the intelligent agent for expediency and efficiency. Each cached object in the object reference is called a personal assistant content object (PACO). The handling of such objects is described further below. The local cached object reference allows changes to the interfaces to data information services to be easily added and maintained.

To interface with local data on the PC or server, the intelligent agent preferably uses a commercial interface to microsoft outlook such as outlook redemption available at www.dimastr.com (as of May 21, 2004). Data content from outside the PC is obtained by sourcing module 350. In the case of computer system 280 being a server system, the intelligent agent may utilize a commercial interface such as compoze exchange connector (www.compoze.com as of May 2004) to be able to connect to mail and calendaring services within Microsoft Exchange.

The intelligent agent 180 has a software interface designed to allow the user to customize the rules which they would like to have configured for their desktop PC or server information. The intelligent agent also has a set of software interfaces for communicating with any structured data source, such as XML data, SQL data, HTML data, email data, RSS news data, operating system data, file data, word processed document data.

The voice relay server 124 performs a number of critical functions. These services or functions include: maintenance of a physical network connection to the remote PC or server, logical connection to the remote PC or server through which data packet exchange can be performed, presence detection, and secure connection management. These functions and services are described in more detail below.

Before a logical connection can be set up, one or more physical connections must be established between the voice relay server and the intelligent agent on the PC or server. In the case that neither the voice relay server or the desktop Pc or server can be reached directly (for example, because systems may be behind firewalls or on an internal network and do not have physical Internet addresses), then a physical connection manager (PCM) (not shown) on the voice relay server will establish a connection to the remote PC using a secure port. This PCM connection through a secure port is established by the PC or server intelligent agent declaring itself to the Voice Relay Server and establishing a port connection in one direction to the voice relay server and then using piggy-back capabilities of TCP/IP allowing the voice relay server to communicate back with the PC or Server over the same secure TCP/IP connection.

Since only the voice relay server has a well-known IP address and can be connected to directly, the PCM relies on participating intelligent agent PCs or servers to initiate their respective connections to the PCM (to declare themselves to the voice relay server). The PCM maintains the intelligent agent connections, associates them with the identities of their owners, and performs the actual data exchange at the protocol level, upon the direction of the users, using voice commands to access the set of services available to them on the remote PC or server.

Before messages can be exchanged, a data pipe, or logical connection must exist between the voice relay server and the intelligent agent on the PC or server. A logical connection manager (LCM) (not shown) on the voice relay server is responsible for defining such a pipe, and establishing and maintaining it. A logical connection can be made up of one or more physical connections. If the IP address of either party engaged in a message exchange session can be reached via the open network, a physical connection can be set up directly between the parties and serves as the logical connection, without the server LCM being involved. If a logical connection is made up of more than one physical connection, the LCM has to keep track of the identities and states of these Physical connections.

Before messages can be exchanged between the voice relay server and the remote intelligent agent PC, the communication end point (i.e. IP address) of the participants must be known. A presence manager (PM) (which is the network ID registration module 250) running on the voice relay server is responsible for keeping track of this information. This is a relatively passive component. It relies on the intelligent agents to inform the PM on the voice relay server of their IP addresses. A PM client (which is the network ID notification module 380) must be running in each participating client device (i.e. as part of the intelligent agent function) to register the device's presence to the PM on the voice relay server periodically over time.

The presence manager is constantly managing a table of intelligent agent PCs or servers such that an incoming user connection is always guaranteed to be able to connect to the corresponding remote intelligent agent on the user's PC or server, assuming that this PC or server is switched on and declaring its presence.

In order to determine that a physical connection request is from an authorized participant, the requester's identity needs to be authenticated. An identity unique in the voice relay server namespace must be associated with each participating user and end device. Each such device belongs to an owner who must also have a unique identity. These identities also serve as the basis to control access to services and resources anchored on the voice relay server and on the remote intelligent agent PC or server. User authentication module 270. A security manager (SM) is responsible for managing, maintaining and enforcing the security policy for authenticating the user in an internal table (typically in a database). The security manager is also responsible for managing a secure connection to the remote PC or server, such that a data pipe may be encrypted between the voice relay server and the remote intelligent PC. The security may be at the packet level or at the connection level (such as SSL type secure connections).

The intelligent agent responds to commands from the user, which may entail retrieving, creating or modifying personal data on the user's PC, such as a database item, email items, news items, personal local files, calendar items, word processed documents or other structured data. The user may also issue commands to start processes on the personal PC, such as launch programs or stop programs. Advantageously, the user may issue commands to manage specific data items on their personal PC, such as composing an email, deleting a database item, reviewing an item in a database or reading a web page from their PC.

The intelligent agent has a number of defined 'data interfaces' which can communicate with information stored locally on the PC, or available to the PC through a network connection. One such data interface is to SQL databases, such that the intelligent agent may read, update, delete, add or replace data items inside a standard SQL database on the PC or on a network connected to the PC.

Advantageously, once the intelligent agent on the PC determines (using the rules engine) that alert data is to be sent, an alert or data packet is sent to the voice relay server in order to place an outbound call to the appropriate remote users telephone. The intelligent agent is configured to access local information in an unattended and scheduled manner. The rules engine on the intelligent agent has a built in scheduler with which a user can configure periodic accesses to information on the local PC or a network that the PC is connected to. The rules engine also provides a method for certain data strings to be created, which are compared against local data on the PC or the local network.

In the event that a match or satisfying 'data parameter' is detected (according to the user-defined rules), an alert mechanism triggers the intelligent agent to send a command to the voice relay server to place an out-bound call to the correct user (i.e. the user registered for that PC). The voice relay server establishes a telephone connection to the user and converts the alert to a speech stream for the user to hear. The user can customize the alerts that are to be sent to the voice relay server and the user can set the frequency of these alerts using a desktop administration software tool, which is a part of the intelligent agent program on the PC.

In indexing module 340, whenever any content source is accessed a mathematical digest of the individual item is calculated and stored in the sourcing components store. At any point if content sourcing module 350 retrieved an item whose calculated digest did not match any of the digests stored for that particular item type it would be considered as non-duplicate and original for the purpose of filtering and processing.

If however the calculated digest matched a stored digest for that item type it would be considered a duplicate and would be ignored for the purpose of filtering and processing. This provides a way to mathematically represent a data object (such as a text email) in a form that would significantly improve performance and minimize the data storage requirement for the content filtering of the intelligent agent. Hence an email that was still on a mail server and had not been previously viewed, would appear as a new data content item for the intelligent agent to recognize and match against.

Indexing module 340 comprises a digest generator and an indexed digest list repository.

Digest Generator—This component would accept a content source object and create a mathematically computed digest of the inputted object. The algorithm used could be MD5 or SHA or a combination of the two. It would have an interface for accepting a content object such as an email or a news item or a stock quote and returning a mathematical digest.

Indexed Digest List Repository—This component is a repository for digests of different content source types. It provides mechanisms for storing, matching and reconciling digests of different types.

The remote access system 100 may be required to monitor, filter and deliver different types of content to end users with varying form factors, via a voice notification. This content constantly changes with varying needs. This content source may have to be stored in a cache or in a persistent database for processing. As content sources change the structure of the underlying data store will also have to change. For example the content store may be required to store email and news presently, while in the future it may store stock transactions and weather information or traffic alerts.

An analysis of most content sources identified attributes which were consistent across content sources such as source, destination, title. The content data varied with the type. Thus, the common attributes can be normalized at the data persistence level while the varying attributes can be normalized at the application level. Additionally serialization and de-serialization mechanisms ensure that the varying content objects can be persisted to a data store and recreated form the data store.

Functional Components of the PACO structure are described below.

Generic PACO—All content source objects should be capable of being stored as generic PACO objects. The component has a mechanism to allow conversion from a specific content object to a generic PACO object.

PACO Serializer—This component is capable of serializing a generic PACO object into a format suitable for the underlying data store. The latter could be a relational database, a local file or even memory storage. It is also capable of deserializing a stored generic PACO object.

PACO Encoder—The PACO Encoder is capable of encoding the serializable generic PACO object into a form which meets the security requirements of the system. It is also capable of decoding the serialized object.

PACO Access Component—This component is capable of storing encoded, serialized generic PACO objects. This has a PACOAccessObjectFactory which creates a requisite PACOAccessObject. The latter would also have to exist to interface with the underlying data store.

Requirements—The PACO and its datalayer module are to be used to encapsulate all disparate content objects within a generic content object. The latter object is called a PA Content Object. The PA Content Object should lend itself to quick data access by its merits of mapping disparate content objects to the generic content object at the application level. At the persistence level, the generic content object should always map to the same table in a relational database. The main searchable fields namely the source, the destination, the title, the identifier and the type should be normalized at the database level, whereas the integrity of the application specific details field should be maintained at the application level. This will allow a multiplicity of content object types to be stored in a singular representation at the data persistence level while yet offering simplicity of use and no changes to the database with changes in the content type.

Embodiments of the invention have been described herein by way of example. Some modifications or alterations may be made to the embodiments, as will be apparent to persons skilled in the art, without departing from spirit and scope of the invention.

The invention claimed is:

1. A method of providing automatic notification to a user, comprising the steps of:
   providing an agent on a remote computer system;
   providing a rules engine on the agent for constructing rules, wherein a rule is a set of conditions for content to determine the occurrence of notification events, wherein the rules engine comprises:
   a rule builder configured to accept a set of inputs to construct a rule and further configured to define the set of conditions for the content to be met for execution of an action associated with the rule;
   a reasoning module configured to analyze a set of inputs and the set conditions for a rule to determine if an action associated with the rule should be executed;

a rule validator configured to validate a rule by checking for completeness, integrity, conditions, and measurement indicators, wherein the rule validator is further configured to notify the rule builder of inconsistent rule structure; and a rule processor configured to execute an action associated with a rule by using the rule validator to validate the rule and the reasoning module to determine if the action associated with the rule should be executed;

providing rules on the agent using the rules engine;

sourcing content accessible to the remote computer system;

at the agent on the remote computer system, determining that the content satisfies at least one rule to determine the occurrence of a notification event;

at the agent on the remote computer system, generating notification data packets, wherein the notification data packets comprise packetized text representing the content and a user identifier corresponding to the user;

transmitting the notification data packets over a network from the remote computer system to a server system for communication of a notification, based on the notification event, to a telephone of the user;

at the server system, generating speech signals corresponding to packetized text representing the content;

establishing a telephone connection to the telephone of the user using the user identifier; and transmitting the speech signals to the telephone of the user.

2. The method of claim 1, wherein the step of establishing comprises:

determining a user identifier from the notification data;

accessing a database to determine a telephone number of the user based on the user identifier; and calling the telephone number.

3. The method of claim 1 further comprising storing the notification data in a database until a scheduled time for notifying the user.

4. The method of claim 1 further comprising, upon determining that the content satisfies at least one rule, generating a content object corresponding to the content and storing the content object in a database until a scheduled time for notifying the user, wherein the content object is for use in generating the notification data packets.

5. The method of claim 1 wherein the step of sourcing content accessible to the computer system is on a scheduled basis according to one or more rules.

6. A system for providing automatic notification to a user, the system comprising:

a server system, the server system being in communication with a network for establishing a connection to a telephone operated by a user using a user identifier and for transmitting automatically generated speech signals to the telephone;

a rules engine for constructing rules, wherein a rule is a set of conditions for content to determine the occurrence of a notification event, wherein the rule engine comprises:

a rule builder configured to accept a set of inputs to construct a rule and further configured to define the set of conditions for the content to be met for execution of an action associated with the rule;

a reasoning module configured to analyze a set of inputs and the set conditions for a rule to determine if an action associated with the rule should be executed;

a rule validator configured to validate a rule by checking for completeness, integrity, conditions, and measurement indicators, wherein the rule validator is further configured to notify the rule builder of inconsistent rule structure; and a rule processor configured to execute an action associated with a rule by using the rule validator to validate the rule and the reasoning module to determine if the action associated with the rule should be executed; and an agent resident on a remote computer system, the agent being in communication with the server system over the network and programmed to access content accessible to the remote computer system and to transmit the user identifier corresponding to the user and packetized text representing the content to the server system over the network in response to the agent determining that the content satisfies a rule;

wherein, when the server system receives the packetized text representing the content from the agent on the remote computer system, the server system is programmed to automatically generate speech signals based on the packetized text representing the content and to transmit the speech signals to a telephone associated with the user using the user identifier.

7. The system of claim 6, wherein the computer system is separated from the server system by a firewall and wherein the agent is programmed to periodically transmit an IP address of the computer system to the server system.

8. The system of claim 6, wherein the computer system is a personal computer.

9. The system of claim 6, wherein the computer system comprises a remote server and the user has a user account on the remote server.

10. The system of claim 9, wherein the remote server hosts a plurality of user accounts and the agent facilitates remote access to each of the user accounts via the server system.

11. The system of claim 6, wherein the notification event originates from the agent, the notification event being generated by the agent based on at least one user-defined rule.

12. The system of claim 6, wherein the server system comprises a speech server for communicating with the user over the public telephone network using automated speech recognition for received speech signals and automatic text-to-speech conversion for transmitted speech signals.

13. The system of claim 12, wherein the server system further comprises a voice relay server in communication with the speech server and in communication with the agent for receiving the information from the agent and for transmitting command request data to the agent corresponding to a voice command received from the user at the speech server.

14. The system of claim 13, wherein the server system comprises a user information data store and the voice relay server compares user authentication information received from the user at the speech server to the user information data store to authenticate the user for access to the computer system.

15. The system of claim 14, wherein the user authentication information is determined by the speech server based on an identification utterance received from the user over the public telephone network.

16. The system of claim 6, wherein the notification event comprises receipt of command data from the server system and the command data corresponds to a voice command received at the server system over the public telephone network.

17. The system of claim 6 further comprising an indexing module configured to compute a mathematical digest of the content that satisfies the rule and further configured to determine whether the computed mathematical digest of the content is a duplicate by matching the computed mathematical digest against an indexed digest list repository of mathematical digests for content; and wherein the agent is configured to generate packetized text representing the content if its computed mathematical digest is not a duplicate.

18. A method of providing notification to a user, comprising:

receiving a connection request at a server system over a network from an agent on a remote computer system;

establishing a secure connection between the and the server system for data packet exchange, wherein the secure connection is encrypted;

receiving notification data packets over the network at the server system from the agent on the remote computer system, wherein the notification data packets comprises packetized text representing content that satisfies a rule constructed using a rules engine, wherein the rule engine comprises:

a rule builder configured to accept a set of inputs to construct the rule and further configured to define a set of conditions for the content to be met for execution of an action associated with the rule;

a reasoning module configured to analyze a set of inputs and the set conditions for a rule to determine if an action associated with the rule should be executed;

a rule validator configured to validate a rule by checking for completeness, integrity, conditions, and measurement indicators, wherein the rule validator is further configured to notify the rule builder of inconsistent rule structure; and a rule processor configured to execute an action associated with a rule by using the rule validator to validate the rule and the reasoning module to determine if the action associated with the rule should be executed;

processing the notification data packets at the server system to generate speech signals corresponding to the packetized text;

establishing a telephone connection from the server system to a telephone of the user based on the connection request; and transmitting the speech signals from the server system to the telephone of the user over the telephone connection.

19. The method of claim 18, wherein the step of establishing a telephone connection comprises:

determining a user identifier from the connection request;

accessing a database to determine a telephone number of the user based on the user identifier; and calling the telephone number.

20. The method of claim 18, wherein the connection request and notification data are generated by the agent in response to determination of a notification event, the notification event being determined according to at least one predefined rule.

21. Non-transitory computer readable program storage having stored thereon computer program instructions which, when executed on a computer system, cause the computer system to perform the method of providing automatic notification to a user of claim 1.

22. Non-transitory computer readable program storage having stored thereon computer program instructions which, when executed on a computer system, cause the computer system to perform the method of providing notification to a user of claim 18.

* * * * *

UNITED STATES PATENT AND TRADEMARK OFFICE
CERTIFICATE OF CORRECTION

PATENT NO.        : 7,869,577 B2
APPLICATION NO.   : 11/560161
DATED             : January 11, 2011
INVENTOR(S)       : Simon G. Arnison Page 1 of 1

It is certified that error appears in the above-identified patent and that said Letters Patent is hereby corrected as shown below:

1. Column 19, line 11, "the and the" should read --the agent and the--.

Signed and Sealed this
Twenty-second Day of March, 2011

David J. Kappos
*Director of the United States Patent and Trademark Office*